(12) United States Patent
Epping et al.

(10) Patent No.: US 11,093,138 B2
(45) Date of Patent: Aug. 17, 2021

(54) OPTIMIZING VIRTUAL MACHINE STORAGE PERFORMANCE IN A STRETCHED CLUSTER

(71) Applicant: VMware, Inc., Palo Alto, CA (US)

(72) Inventors: Duncan Epping, Helmond (NL); Cormac Hogan, Cork (IE); Frank Denneman, Purmerend (NL)

(73) Assignee: VMware, Inc., Palo Alto, CA (US)

( * ) Notice: Subject to any disclaimer, the term of this patent is extended or adjusted under 35 U.S.C. 154(b) by 27 days.

(21) Appl. No.: 16/684,369

(22) Filed: Nov. 14, 2019

(65) Prior Publication Data

US 2021/0149562 A1    May 20, 2021

(51) Int. Cl.
*G06F 3/06* (2006.01)
*G06F 9/455* (2018.01)

(52) U.S. Cl.
CPC .............. *G06F 3/061* (2013.01); *G06F 3/067* (2013.01); *G06F 3/0647* (2013.01); *G06F 9/45558* (2013.01); *G06F 2009/45579* (2013.01)

(58) Field of Classification Search
CPC ................ G06F 9/45558; G06F 2009/4557
See application file for complete search history.

(56) References Cited

U.S. PATENT DOCUMENTS 10,083,057 B1 * 9/2018 Currie ................ G06F 9/45558
2017/0277556 A1 * 9/2017 Ishii ..................... G06F 16/1844

* cited by examiner

Primary Examiner — Edward J Dudek, Jr.

(57) ABSTRACT

Techniques for optimizing virtual machine (VM) storage performance in a hyper-converged infrastructure (HCI) deployment comprising a stretched cluster of host systems are provided. In one set of embodiments, a computer system can identify one or more stretched VMs in the stretched cluster, where storage objects associated with the one or more stretched VMs are replicated across the sites of the cluster. The computer system can further determine, for each stretched VM, whether a greater number of the VM's storage objects are accessible to the VM via site-local replica copies residing at a first site where the VM is currently running, or via site-remote replica copies residing at a second site where the VM is not currently running. If a greater number of the VM's storage objects are accessible to the VM via the site-remote replica copies, the VM can be migrated from the first site to the second site.

21 Claims, 8 Drawing Sheets

OPTIMIZING VIRTUAL MACHINE STORAGE PERFORMANCE IN A STRETCHED CLUSTER

BACKGROUND

In a hyper-converged infrastructure (HCI) deployment comprising a cluster of host systems, persistent data associated with the cluster's virtual machines (VMs) is maintained in the form of storage objects that are stored on the local storage resources (e.g., directly-attached solid-state disks, directly-attached magnetic disks, etc.) of the host systems. In cases where the cluster is configured as a "stretched cluster," the host systems are spread across at least two different physical locations, known as sites. VMs may be stretched across these sites from a storage perspective such that the VMs' storage objects are replicated on host system(s) at each site.

Typically, a VM that is stretched in this manner (referred to as a "stretched VM") will access the replica copies of its storage objects that reside at the site where the VM is currently running (referred to as "site-local replica copies"). If a stretched VM loses access to these site-local replica copies due to, e.g., host or network failures, existing HCI platforms will generally keep the VM running at its current site and redirect the VM's I/O requests for its storage objects to the replica copies maintained at the other site of the stretched cluster (referred to as "site-remote replica copies"). However, this approach requires the I/O requests to traverse the network link(s) interconnecting the two sites, which undesirably increases the latency for completing the requests and thus reduces the VM's overall storage performance.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof 1. Overview Embodiments of the present disclosure are directed to techniques for optimizing the storage performance of stretched VMs in a stretched cluster. At a high level, these techniques involve validating, on a periodic basis for each stretched VM of the cluster, whether a greater number of the VM's storage objects are accessible to the VM via site-local replica copies (i.e., replica copies maintained at the site where the VM is currently running) or site-remote replica copies (i.e., replica copies maintained at the other site of the stretched cluster). If a greater number of the VM's storage objects are accessible via site-local replica copies, no action is taken and the VM can remain running at its current site. However, if a greater number of the VM's storage objects are accessible via site-remote replica copies, the VM is migrated to the other cluster site (or a recommendation to that effect is generated). This ensures that the location of the VM's compute component is kept in-sync with the locations of its storage objects at the site level, thereby reducing the latency of the VM's storage I/O operations and optimizing its storage performance.

2. Example HCI Deployment

Figure 1:
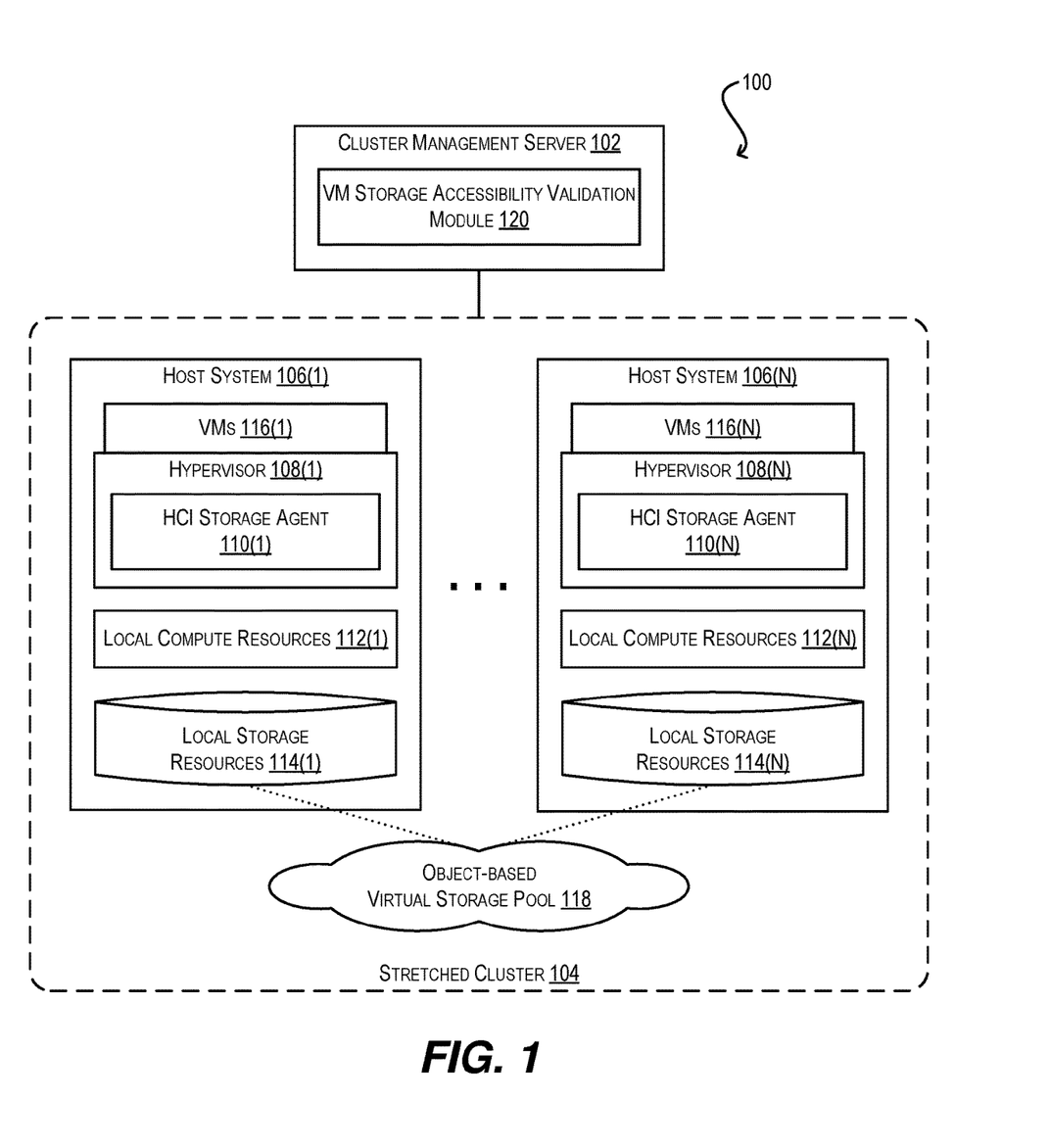
FIG. 1 depicts an example HCI deployment with a stretched cluster according to certain embodiments.

FIG. 1 is a simplified block diagram of an HCI deployment 100 that implements the techniques of the present disclosure according to certain embodiments. As shown, HCI deployment 100 includes a cluster management server 102 that is communicatively coupled with a stretched cluster 104 of host systems 106(1)-(N) (the stretched nature of cluster 104 is explained with respect to FIG. 3 below). Each host system 106 comprises a hypervisor 108 with an HCI storage agent 110, a set of local compute resources 112 (e.g., central processing units (CPUs)), and a set of local storage resources 114 (e.g., directly-attached solid state disks, magnetic disks, non-volatile memory (NVM), etc.).

Hypervisors 108(1)-(N) are configured to virtualize the local compute resources of host systems 106(1)-(N) and allocate the virtualized compute resources to one or more locally running virtual machines (VMs) 116(1)-(N). Each VM, in turn, is configured to utilize the compute resources provided by its respective hypervisor to execute computing workloads (e.g., guest applications) via a guest operating system (OS) layer.

HCI storage agents 110(1)-(N) residing within hypervisors 108(1)-(N) are configured to aggregate local storage resources 114(1)-(N) of host systems 106(1)-(N) into an object-based virtual storage pool 118 and make virtual storage pool 118 available to VMs 116(1)-(N) for data storage purposes. In this way, the persistent data used by VMs 116(1)-(N) can be maintained directly on host systems 106(1)-(N) rather than on separate, dedicated storage servers/arrays.

Figure 2:
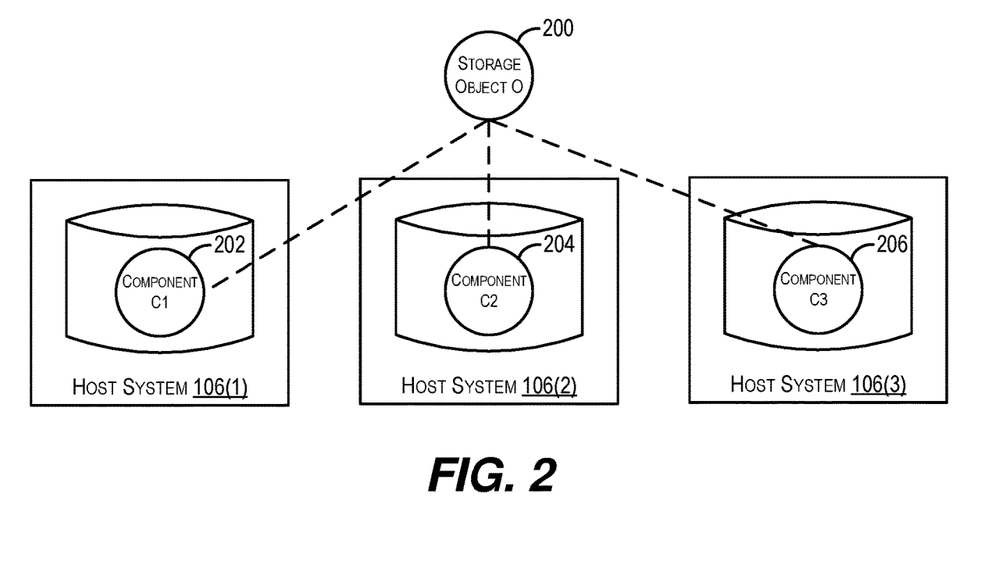
FIG. 2 depicts an example component tree for a storage object according to certain embodiments.

The "object-based" qualifier for virtual storage pool 118 indicates that HCI storage agents 110(1)-(N) manage data in pool 118 in the form of storage objects. Each storage object is a logical data volume/container composed of one or more components, and each component can be understood as a sub-object that contains some portion of the data and/or metadata of the storage object. These components are distributed across the local storage resources of host systems 106(1)-(N) which form the physical storage layer of virtual storage pool 118. For example, FIG. 2 depicts the structure of a simple storage object O (reference numeral 200) according to an embodiment. In this example, storage object O is composed of three components C1 (reference numeral 202), C2 (reference numeral 204), and C3 (reference numeral 206) that are maintained on the local storage resources of host systems 106(1), 106(2), and 106(3) respectively.

Figure 3:
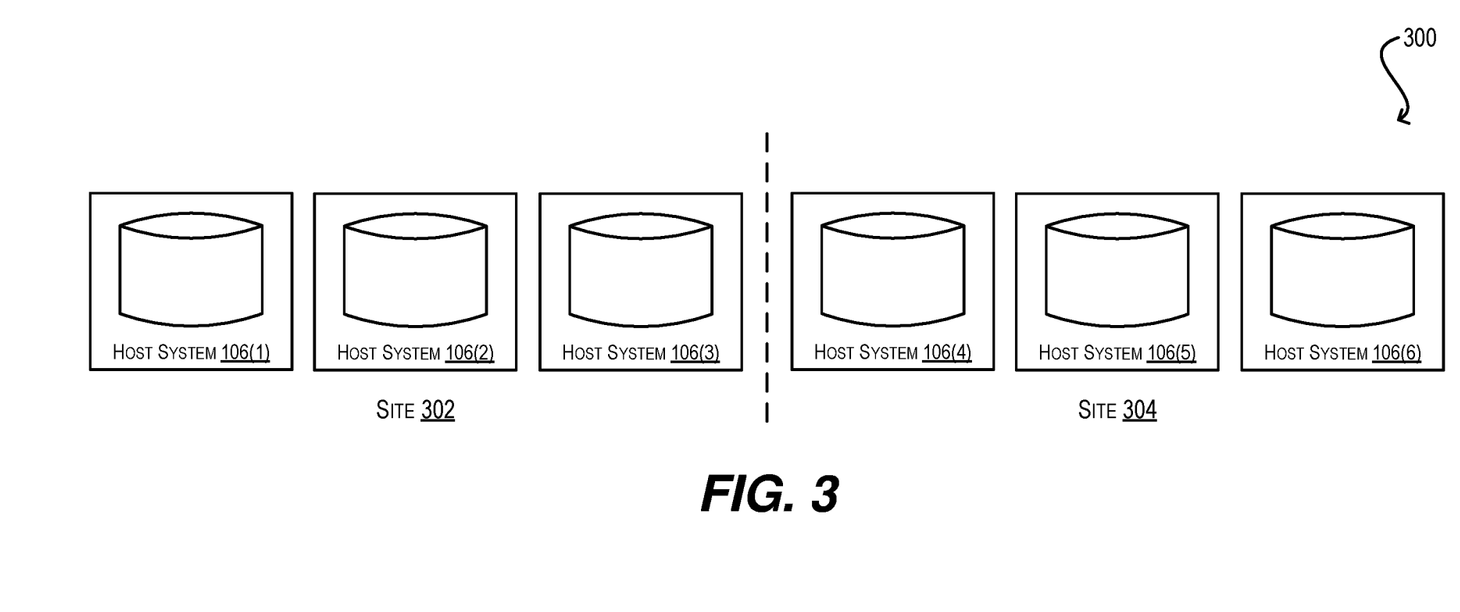
FIG. 3 depicts an example stretched cluster topology according to certain embodiments.

As mentioned above, cluster 104 of FIG. 1 is a stretched cluster, which means that host systems 106(1)-(N) are distributed across two (or more) physical sites (e.g., separate buildings, data centers, etc.). For example, FIG. 3 depicts one possible physical topology (300) for stretched cluster 104 in which host systems 106(1)-(3) are located at a first site 302 and host systems 106(4)-(6) are located at a second site 304. Sites 302 and 304 are connected via an inter-site network link (not shown). Although exactly two sites are depicted here, in alternative embodiments stretched cluster 104 may incorporate one or more additional sites for various purposes (e.g., a "witness" site for redundancy/fault tolerance in case of a site-wide failure at either site 302 or 304).

Figure 4:
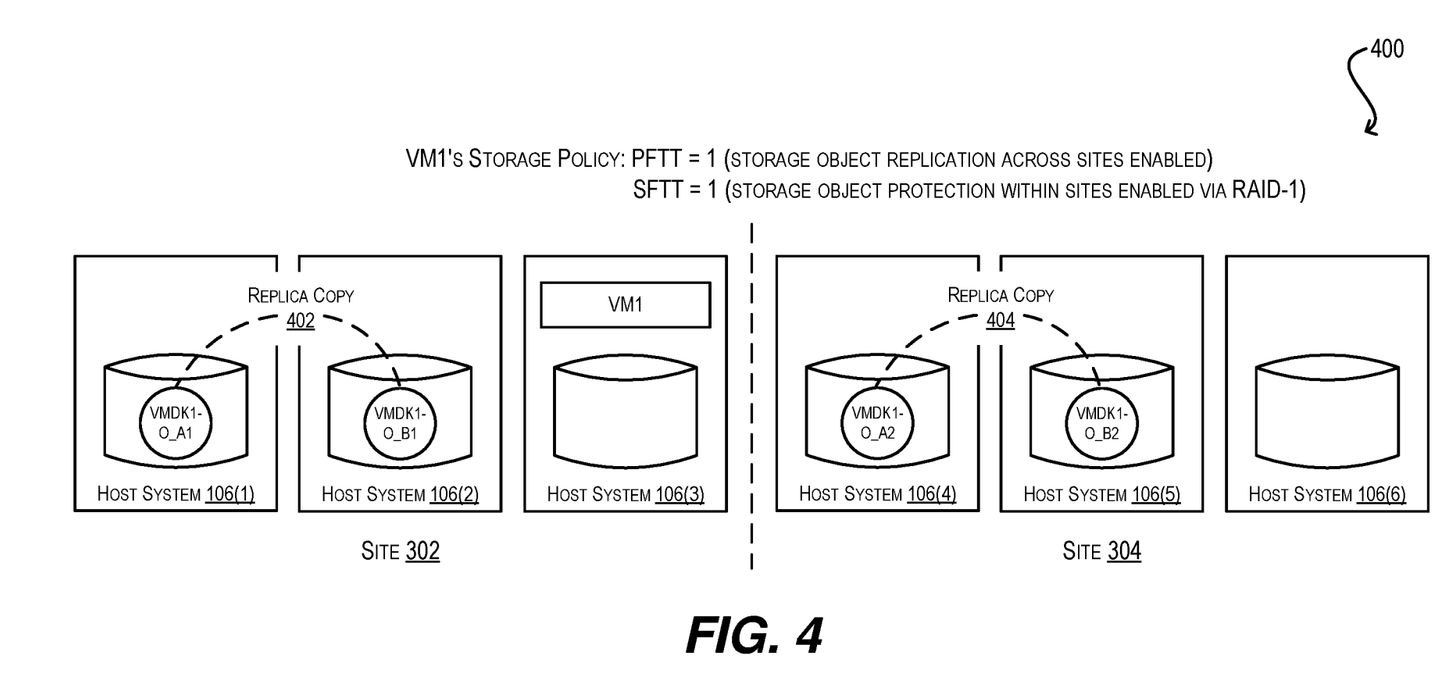
FIG. 4 depicts an example storage object layout scenario for a stretched VM within the stretched cluster topology of FIG. 3 according to certain embodiments.

In a stretched cluster like cluster 104, a VM may be configured (via, e.g., a VM-level storage policy) to be stretched across sites from a storage perspective, such that the VM's associated storage objects (e.g., virtual disk (VMDK) objects, namespace object, swap objects, etc.) are replicated via RAID-1 mirroring at each site. In addition, the replica copies maintained at each site may be further protected, within that individual site, via RAID-1 mirroring or RAID-5/6 parity striping. To illustrate this, FIG. 4 depicts an example scenario 400 in which a virtual machine VM1 with a storage object VMDK1 is deployed in the stretched cluster topology of FIG. 3 and is associated with a storage policy including a "Primary Failures to Tolerate" (PFTT) parameter value of 1 (indicating that VM1 is a stretched VM and thus its storage objects should be replicated across sites) and a "Secondary Failures to Tolerate" (SFTT) parameter value of 1 (indicating that VM1's storage objects should be protected via RAID-1 mirroring within each site). Per the PFTT parameter value of 1, a replica copy of VMDK1 is stored at each site of the cluster (i.e., replica copy 402 at site 302 and replica copy 404 at site 304). Further, per the SFTT parameter of value 1, the replica copy at each site is mirrored via RAID-1 within that site (i.e., replica copy 402 is composed of mirror components VMDK1_A1 and VMDK1_B1 at site 302 and replica copy 404 is composed of mirror components VMDK1_A2 and VMDK1_B2 at site 304).

As mentioned in the Background section, a stretched VM will typically access the site-local replica copies of its storage objects—in other words, the replica copies residing at the site where the VM is currently running—as part of its runtime operation. Thus, in scenario 400 of FIG. 4, VM1 (which is shown as running on host system 106(3) of site 302) will typically access replica copy 402 of VMDK1 (whose components reside on host systems 106(1) and 106(2) of site 302) for read I/O operations.

However, it is possible for VM1 to lose access to site-local replica copy 402 if, e.g., a failure occurs on host system 106(1) and/or 106(2), or if a network failure partitions host system 106(3) from 106(1) and/or 106(2). In these failure scenarios, with existing HCI implementations, VM1 will continue running at site 302 and its I/O requests for VMDK1 will be fulfilled by accessing replica copy 404 residing at remote site 304. Unfortunately, this configuration is suboptimal because it requires all I/O reads and writes initiated by VM1 with respect to VMDK1 to traverse the inter-site network link, which increases the latency of the reads/writes and thus decreases VM1's storage performance.

To address the foregoing and other similar problems, cluster management server of FIG. 1 is enhanced to include a novel VM storage accessibility validation module 120 (hereinafter referred to as "accessibility validator" 120). As described in further detail below, accessibility validator 120 can periodically validate whether each stretched VM deployed in stretched cluster 104 (such as VM1 of scenario 400) can access a greater number of its storage objects via site-local replica copies or site-remote replica copies. If the former is determined to be true, accessibility validator 120 can conclude that the current placement of the stretched VM is optimal from a storage standpoint and no action needs to be taken. However, if the latter is determined to be true, accessibility validator 120 can recommend that the VM be migrated to a host system at the remote site. Cluster management server 102 can then migrate the VM in accordance with the recommendation (thereby co-locating the VM with the majority of its storage objects), or at least consider the recommendation in combination with other placement factors/criteria.

It should be appreciated that FIGS. 1-4 are illustrative and not intended to limit embodiments of the present disclosure. For example, although accessibility validator 120 is shown in FIG. 1 as being a part of cluster management server 102, in alternative embodiments some or all of the functionality attributed to this module may be implemented on other entities in HCI deployment 100/stretched cluster 104, such as on one or more of host systems 106(1)-(N). Further, depending on the HCI implementation, the stretched cluster topologies shown in FIGS. 3 and 4 may include certain other storage object components and/or sites that are not specifically described (e.g., witness components or witness sites as noted previously). One of ordinary skill in the art will recognize other variations, modifications, and alternatives.

3. VM Storage Accessibility Validation Workflow

Figure 5:
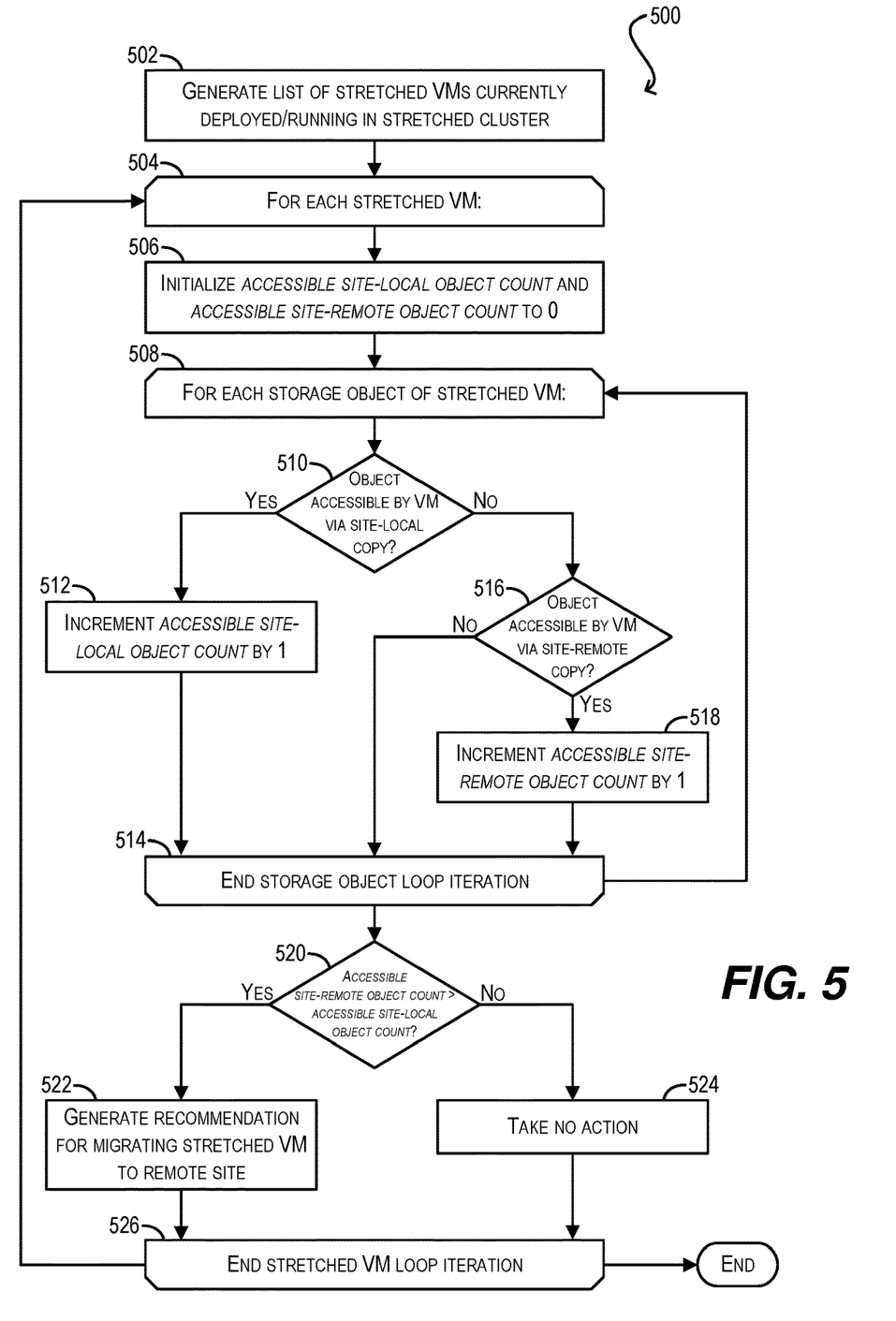
FIG. 5 depicts a VM storage accessibility validation workflow according to certain embodiments.

FIG. 5 depicts a workflow 500 that may be executed by accessibility validator 120/cluster management server 102 for validating the accessibility of storage objects for stretched VMs in stretched cluster 104 according to certain embodiments. Workflow 500 may be carried out on-demand or periodically (e.g., every hour, day, week, etc.) throughout the lifecycle of cluster 104.

Starting with blocks 502 and 504, accessibility validator 120 can generate a list of stretched VMs currently deployed/running in stretched cluster 104 and can enter a loop for each stretched VM. In one set of embodiments, this list can be generated by identifying every deployed/running VM in cluster 104 that has appropriate parameter value(s) specified in its storage policy which indicate that the VM is a stretched VM (e.g., a PFTT value of 1 and a SFTT value greater than or equal to 0).

Within the loop of block 504, accessibility validator 120 can initialize two variables, accessible site-local object count and accessible site-remote object count, to 0 (block 506). Accessibility validator 120 can then enter a second loop for each storage object associated with the current stretched VM (block 508).

Within the second loop of block 508, accessibility validator 120 can validate whether the current storage object is accessible by the stretched VM (or more precisely, by the host system on which the stretched VM is currently running) via the site-local replica copy of the object (block 510). In a particular embodiment, this validation can be implemented using sub-process 600 depicted in FIG. 6.

Figure 6:
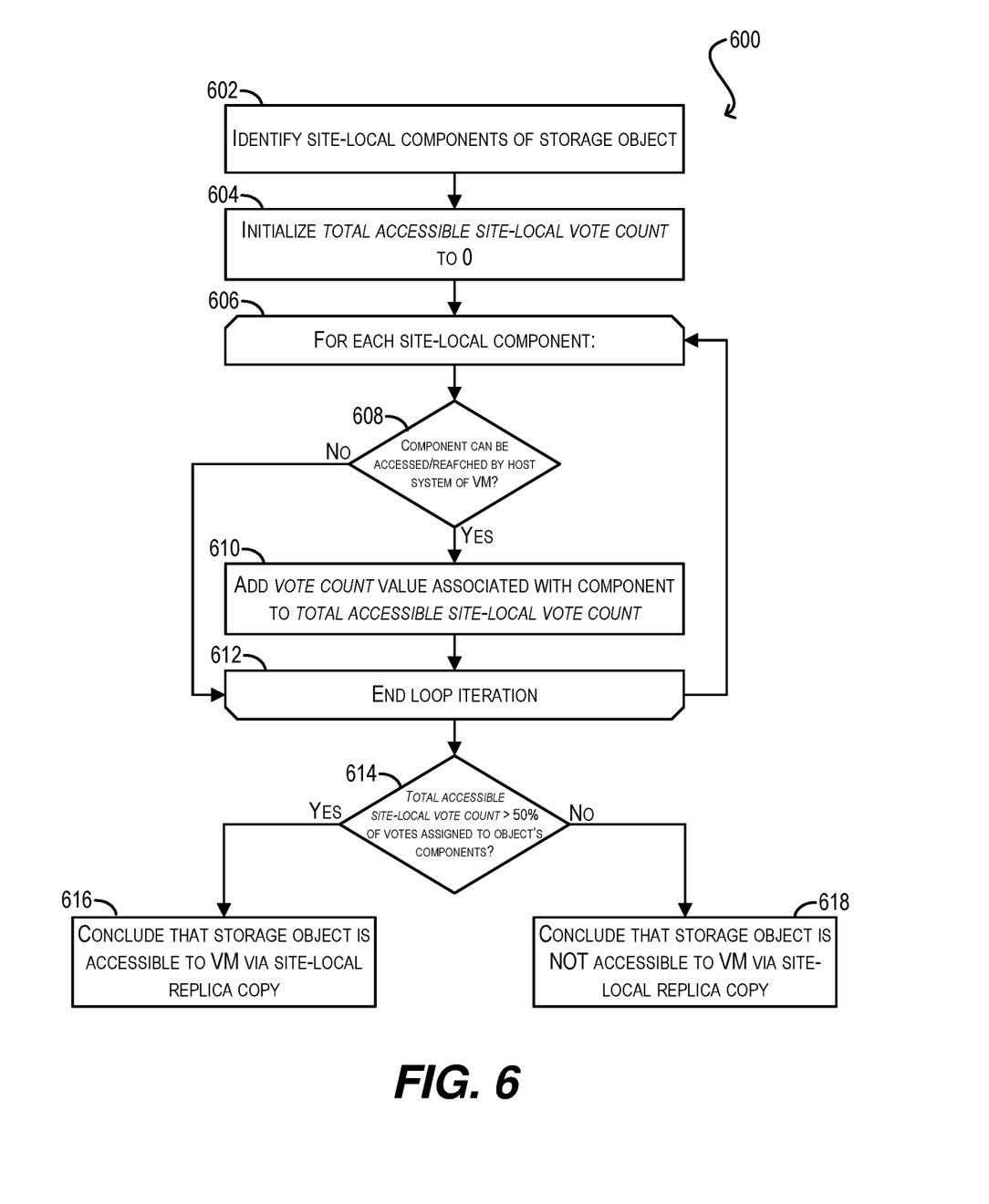
FIG. 6 depicts a workflow for validating whether a stretched VM can access a storage object via a site-local replica copy according to certain embodiments.

As shown in sub-process 600, accessibility validator can first identify the site-local components of the storage object, where these "site-local components" refer to the components which make up the replica copy of the storage object residing at the site where the stretched VM is currently running (block 602). Accessibility validator 120 can then initialize a total accessible site-local vote count variable to 0 (block 604) and enter a loop for each site-local component identified at block 602 (block 606).

Within the loop of block 606, accessibility validator 120 can determine whether the site-local component can be accessed/reached by the host system of the VM and if so, add a vote count value associated with the site-local component to the total accessible site-local vote count (blocks 608 and 610). In various embodiments, this per-component vote count is part of an existing quorum mechanism used by the HCI platform of deployment 100 for various purposes, such as high availability.

Accessibility validator 120 can then reach the end of the current loop iteration (block 612) and return to block 606 in order to process additional site-local components of the storage object. Upon processing all of the site-local components, accessibility validator 120 can check whether the total accessible site-local vote count is greater than 50% of the total number of votes assigned to the storage object's components (block 614). If the answer is yes, accessibility validator 120 can conclude that the storage object is accessible to the stretched VM via the site-local replica copy (block 616). Alternatively, if the answer at block 614 is no, accessibility validator 120 can conclude that the storage object is not accessible to the stretched VM via the site-local replica copy (block 618).

Returning now to workflow 500 of FIG. 5, if accessibility validator 120 determines at block 510 that the current storage object is accessible to the stretched VM via the site-local replica copy of the storage object (in accordance with, e.g., sub-process 600), validator 120 can increment the accessible site-local object count variable by 1 (block 512) and reach the end of the current loop iteration for loop 508 (block 514). Accessibility validator 120 can then re-execute loop 508 for each additional storage object of the stretched VM.

On the other hand, if accessibility validator 120 determines at block 510 that the current storage object is not accessible to the stretched VM via the site-local replica copy of the storage object, validator 120 can further validate whether the current storage object is accessible to the stretched VM (or more precisely, to the host system on which the stretched VM is currently running) via the site-remote replica copy of the storage object (block 516). Similar to the validation at block 510, this validation can be implemented using sub-process 700 depicted in FIG. 7.

Figure 7:
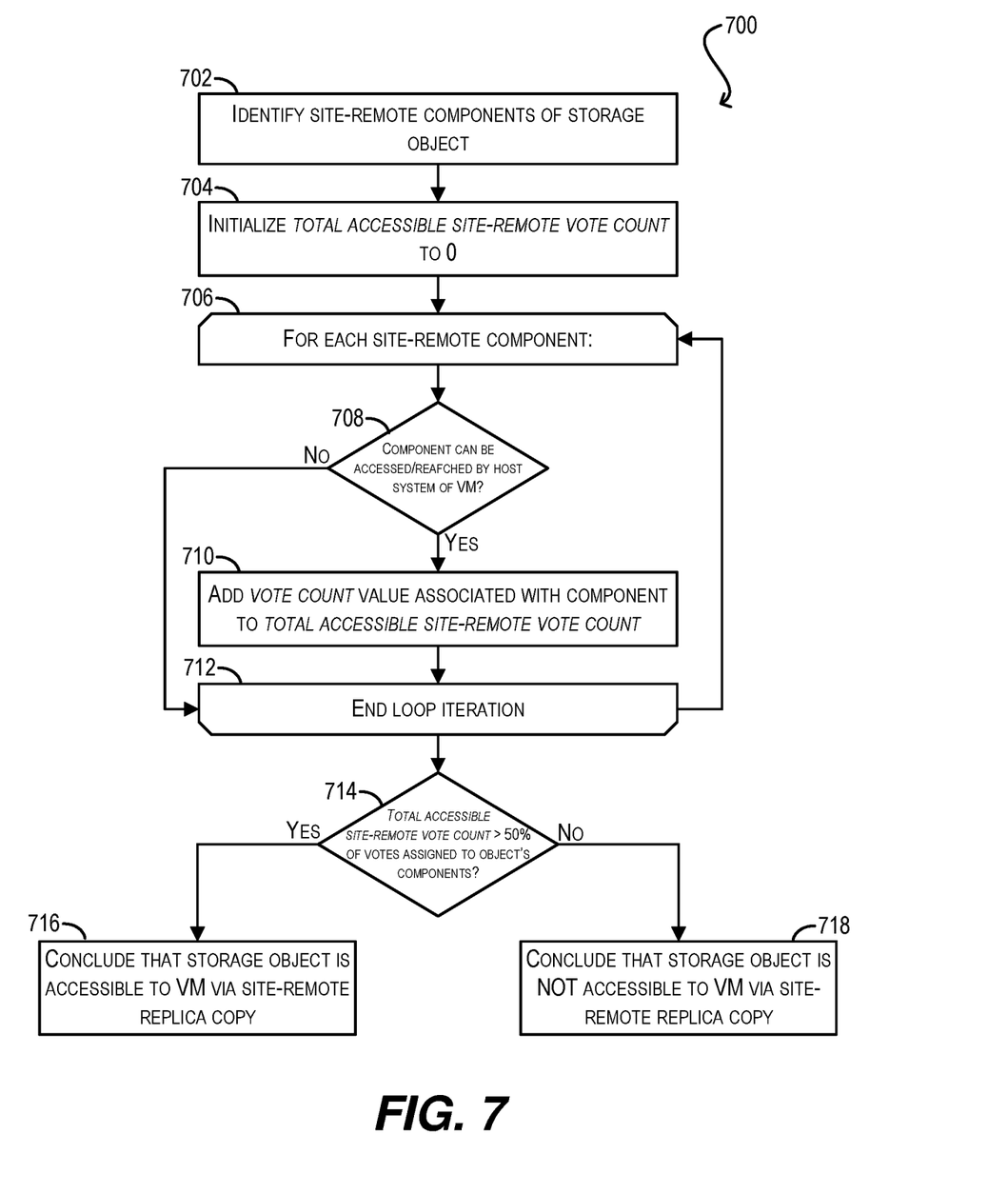
FIG. 7 depicts a workflow for validating whether a stretched VM can access a storage object via a site-remote replica copy according to certain embodiments.

As shown in sub-process 700, accessibility validator can first identify the site-remote components of the storage object, where these "site-remote components" refer to the components which make up the replica copy of the storage object residing at the site of stretched cluster 104 where the stretched VM is not currently running (block 702). Accessibility validator 120 can then initialize a total accessible site-remote vote count variable to 0 (block 704) and enter a loop for each site-remote component identified at block 702 (block 706).

Within the loop of block 706, accessibility validator 120 can determine whether the site-remote component can be accessed/reached by the host system of the VM and if so, add a vote count value associated with the site-remote component to the total accessible site-remote vote count (blocks 708 and 710). Accessibility validator 120 can then reach the end of the current loop iteration (block 712) and return to block 706 in order to process additional site-remote components of the storage object.

Upon processing all of the site-remote components, accessibility validator 120 can check whether the total accessible site-remote vote count is greater than 50% of the total number of votes assigned to the storage object's components (block 714). If the answer is yes, accessibility validator 120 can conclude that the storage object is accessible to the stretched VM via the site-remote replica copy (block 716). Alternatively, if the answer at block 714 is no, accessibility validator 120 can conclude that the storage object is not accessible to the stretched VM via the site-remote replica copy (block 718).

Returning once again to workflow 500 of FIG. 5, if accessibility validator 120 determines at block 516 that the current storage object is accessible to the stretched VM via the site-remote replica copy of the storage object (in accordance with, e.g., sub-process 700), validator 120 can increment the accessible site-remote object count variable by 1 (block 518). Accessibility validator 120 can subsequently reach the end of the current loop iteration for loop 508 (block 514) and re-execute loop 508 as mentioned previously for each additional storage object of the stretched VM.

Once accessibility validator 120 has processed all of the storage objects of the current stretched VM per loop 508, validator 120 can check whether the accessible site-remote object count is greater than the accessible site-local object count (block 520). If the answer is yes, accessibility validator 120 can conclude that a greater number of the stretched VM's storage objects are accessible via the site-remote replica copies residing at the remote site of stretched cluster 104 where the VM is not currently running, and thus can return a recommendation to cluster management server 102 for migrating the VM to that remote site (block 522). Cluster management server 102 can thereafter migrate the VM to a host system at the remote site per the recommendation, or at least take the recommendation into consideration in combination with potentially other migration/placement criteria (e.g., host loads, VM compute requirements, VM host affinity settings, etc.).

Alternatively, if the answer at block 520 is no, accessibility validator 120 can conclude that an equal or greater number of the stretched VM's storage objects are accessible via the site-local copies replica residing at the site of stretched cluster 104 where the VM is currently running. Thus, accessibility validator 120 can take no action in this scenario (block 524).

Finally, at block 526, accessibility validator 120 can reach the end of the current loop iteration of loop 504 and return to the top of the loop to process any additional stretched VMs in stretched cluster 104. Once all of the stretched VMs have been processed, accessibility validator 120 can terminate the workflow.

Figure 8:
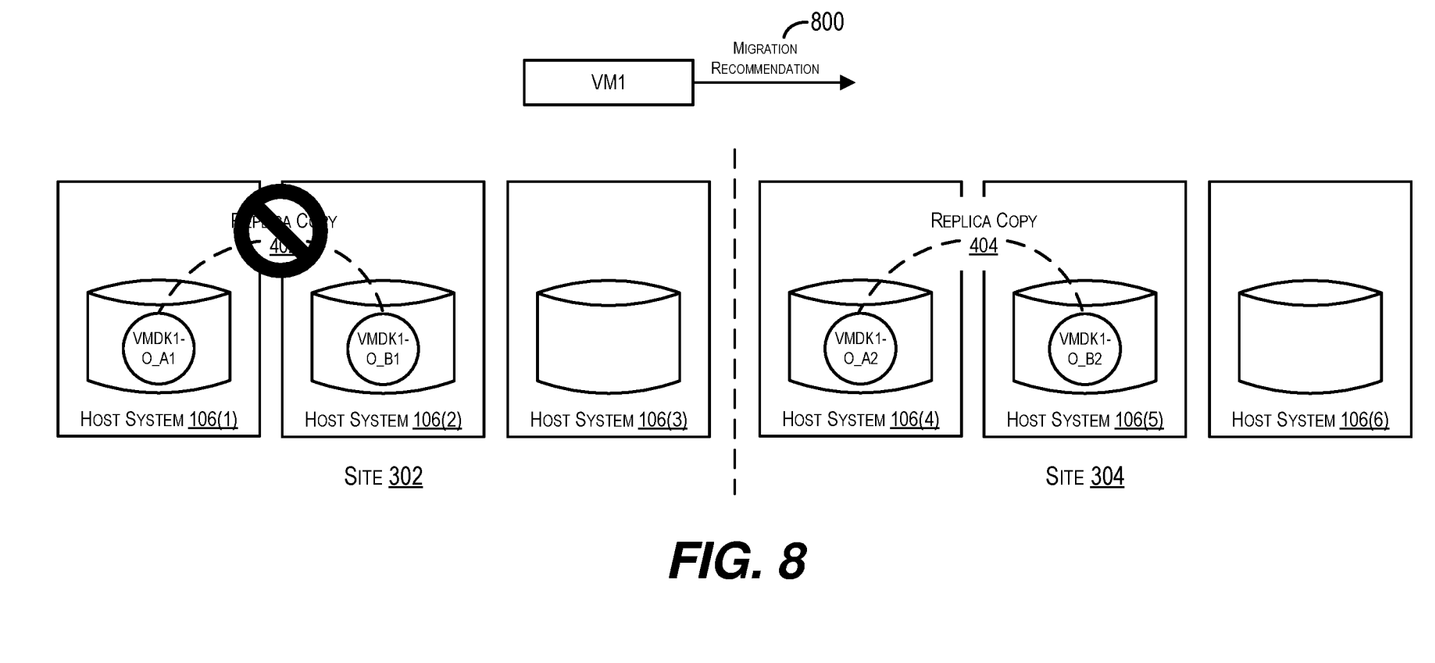
FIG. 8 depicts a result of applying the workflow of FIG. 5 to the scenario of FIG. 4 according to certain embodiments.

To further clarify the processing presented in workflow 500, FIG. 8 depicts the result of applying this workflow to stretched VM1 depicted in scenario 400 of FIG. 4, under the assumption that VM1 loses access to site-local replica copy 402 of its storage object VMDK1. In this case, because VM1 can only access VMDK1 via site-remote replica copy 404 residing at site 304, accessibility validator 120 will recommend migrating VM1 from host system 106(3) of site 302 to a host system at site 304 (shown via reference numeral 800), thereby aligning the location of VM1 with the location of accessible replica copy 404.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for optimizing virtual machine (VM) storage performance in a hyper-converged infrastructure (HCI) deployment comprising a stretched cluster of host systems, the stretched cluster including at least two sites, the method comprising:

identifying, by a computer system, one or more stretched VMs in the stretched cluster, wherein storage objects associated with the one or more stretched VMs are replicated across the at least two sites; and for each of the one or more stretched VMs:

determining, by the computer system, whether a greater number of storage objects of the stretched VM are accessible to the stretched VM via site-local replica copies residing at a first site in the at least two sites where the stretched VM is currently running, or via site-remote replica copies residing at a second site in the at least two sites where the stretched VM is not currently running, wherein determining whether a storage object of the stretched VM is accessible to the stretched VM via a site-local replica copy or via a site-remote replica copy is based on:

a count of site-local components of the site-local replica copy that are accessible to the stretched VM; and a count of site-remote components of the site-remote replica copy that are accessible to the stretched VM; and if a greater number of storage objects of the stretched VM are accessible to the stretched VM via the site-remote replica copies residing at the second site, causing, by the computer system, the stretched VM to be migrated from a host system at the first site to a host system at the second site.

2. The method of claim 1 further comprising:

if a greater number of storage objects of the stretched VM are accessible to the stretched VM via the site-local replica copies residing at the first site, causing the stretched VM to remain running at the first site.

3. The method of claim 1 wherein identifying the one or more stretched VMs comprises:

identifying VMs in the stretched cluster that are associated with a VM-level storage policy indicating that the VMs' storage objects should be replicated across the at least two sites.

4. The method of claim 1 wherein the determining comprises, for each storage object of the stretched VM:

for each of the site-local components:

if the site-local component is accessible to the stretched VM, adding a vote count associated with the site-local component to a total site-local vote count for the storage object.

5. The method of claim 4 wherein the storage object is determined to be accessible to the stretched VM via the site-local replica copy if the total site-local vote count is greater than half of a total number of votes assigned to components of the storage object.

6. The method of claim 1 wherein the determining comprises, for each storage object of the stretched VM:
for each of the site-remote components:
if the site-remote component is accessible to the stretched VM, adding a vote count associated with the site-remote component to a total site-remote vote count for the storage object.

7. The method of claim 6 wherein the storage object is determined to be accessible to the stretched VM via the site-remote replica copy if the total site-remote vote count is greater than half of a total number of votes assigned to components of the storage object.

8. A non-transitory computer readable storage medium having stored thereon program code executable by a computer system, the program code embodying a method for optimizing virtual machine (VM) storage performance in a hyper-converged infrastructure (HCI) deployment comprising a stretched cluster of host systems, the method comprising:
identifying one or more stretched VMs in the stretched cluster, wherein storage objects associated with the one or more stretched VMs are replicated across the at least two sites; and
for each of the one or more stretched VMs:
determining whether a greater number of storage objects of the stretched VM are accessible to the stretched VM via site-local replica copies residing at a first site in the at least two sites where the stretched VM is currently running, or via site-remote replica copies residing at a second site in the at least two sites where the stretched VM is not currently running, wherein determining whether a storage object of the stretched VM is accessible to the stretched VM via a site-local replica copy or via a site-remote replica copy is based on:
a count of site-local components of the site-local replica copy that are accessible to the stretched VM; and
a count of site-remote components of the site-remote replica copy that are accessible to the stretched VM; and
if a greater number of storage objects of the stretched VM are accessible to the stretched VM via the site-remote replica copies residing at the second site, causing the stretched VM to be migrated from a host system at the first site to a host system at the second site.

9. The non-transitory computer readable storage medium of claim 8 wherein the method further comprises:
if a greater number of storage objects of the stretched VM are accessible to the stretched VM via the site-local replica copies residing at the first site, causing the stretched VM to remain running at the first site.

10. The non-transitory computer readable storage medium of claim 8 wherein identifying the one or more stretched VMs comprises:
identifying VMs in the stretched cluster that are associated with a VM-level storage policy indicating that the VMs' storage objects should be replicated across the at least two sites.

11. The non-transitory computer readable storage medium of claim 8 wherein the determining comprises, for each storage object of the stretched VM:
for each of the site-local components:
if the site-local component is accessible to the stretched VM, adding a vote count associated with the site-local component to a total site-local vote count for the storage object.

12. The non-transitory computer readable storage medium of claim 11 wherein the storage object is determined to be accessible to the stretched VM via the site-local replica copy if the total site-local vote count is greater than half of a total number of votes assigned to components of the storage object.

13. The non-transitory computer readable storage medium of claim 8 wherein the determining comprises, for each storage object of the stretched VM:
for each of the site-remote components:
if the site-remote component is accessible to the stretched VM, adding a vote count associated with the site-remote component to a total site-remote vote count for the storage object.

14. The non-transitory computer readable storage medium of claim 13 wherein the storage object is determined to be accessible to the stretched VM via the site-remote replica copy if the total site-remote vote count is greater than half of a total number of votes assigned to components of the storage object.

15. A computer system comprising:
a processor; and
a non-transitory computer readable medium having stored thereon program code that, when executed, causes the processor to:
identify one or more stretched VMs in a stretched cluster, wherein storage objects associated with the one or more stretched VMs are replicated across at least two sites of the stretched cluster; and
for each of the one or more stretched VMs:
determine whether a greater number of storage objects of the stretched VM are accessible to the stretched VM via site-local replica copies residing at a first site in the at least two sites where the stretched VM is currently running, or via site-remote replica copies residing at a second site in the at least two sites where the stretched VM is not currently running, wherein determining whether a storage object of the stretched VM is accessible to the stretched VM via a site-local replica copy or via a site-remote replica copy is based on:
a count of site-local components of the site-local replica copy that are accessible to the stretched VM; and
a count of site-remote components of the site-remote replica copy that are accessible to the stretched VM; and
if a greater number of storage objects of the stretched VM are accessible to the stretched VM via the site-remote replica copies residing at the second site, cause the stretched VM to be migrated from a host system at the first site to a host system at the second site.

16. The computer system of claim 15 wherein the program code further causes the processor to:

if a greater number of storage objects of the stretched VM are accessible to the stretched VM via the site-local replica copies residing at the first site, cause the stretched VM to remain running at the first site.

17. The computer system of claim 15 wherein the program code that causes the processor to identify the one or more stretched VMs comprises program code that causes the processor to:
    identify VMs in the stretched cluster that are associated with a VM-level storage policy indicating that the VMs' storage objects should be replicated across the at least two sites.

18. The computer system of claim 15 wherein the program code that causes the processor to determine whether a greater number of storage objects of the stretched VM are accessible to the stretched VM via the site-local replica copies or via the site-remote replica copies comprises program code that causes the processor to, for each storage object of the stretched VM:
    for each of the site-local components:
        if the site-local component is accessible to the stretched VM, add a vote count associated with the site-local component to a total site-local vote count for the storage object.

19. The computer system of claim 18 wherein the storage object is determined to be accessible to the stretched VM via the site-local replica copy if the total site-local vote count is greater than half of a total number of votes assigned to components of the storage object.

20. The computer system of claim 15 wherein the program code that causes the processor to determine whether a greater number of storage objects of the stretched VM are accessible to the stretched VM via the site-local replica copies or via the site-remote replica copies comprises program code that causes the processor to, for each storage object of the stretched VM:
    for each of the site-remote components:
        if the site-remote component is accessible to the stretched VM, add a vote count associated with the site-remote component to a total site-remote vote count for the storage object.

21. The computer system of claim 20 wherein the storage object is determined to be accessible to the stretched VM via the site-remote replica copy if the total site-remote vote count is greater than half of a total number of votes assigned to components of the storage object.

* * * * *